(12) United States Patent
Hamann et al.

(10) Patent No.: US 6,811,888 B2
(45) Date of Patent: Nov. 2, 2004

(54) ANTI-SPATTER COATING FOR LASER MACHINING

(75) Inventors: Christoph Hamann, Thalmassing (DE); Michael J. Kelley, Newport News, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 10/323,974

(22) Filed: Dec. 20, 2002

(65) Prior Publication Data

US 2003/0180569 A1 Sep. 25, 2003

Related U.S. Application Data

(63) Continuation-in-part of application No. 10/235,503, filed on Sep. 6, 2002.
(60) Provisional application No. 60/318,690, filed on Sep. 7, 2001.

(51) Int. Cl.[7] ............................ B32B 3/24; B23K 26/18; B23K 26/38
(52) U.S. Cl. ................ 428/596; 428/307.3; 219/121.71
(58) Field of Search ................................ 428/596, 457, 428/458, 324.4, 307.3; 219/121.71

(56) References Cited

U.S. PATENT DOCUMENTS

| | | | |
|---|---|---|---|
| 4,156,807 A | 5/1979 | Howard et al. | 219/121 EM |
| 4,490,412 A | * 12/1984 | Yotuyanagi et al. | 427/122 |
| 4,532,403 A | 7/1985 | Jordan et al. | 219/121 ED |
| 4,623,563 A | * 11/1986 | Noda et al. | 427/379 |
| 4,857,698 A | 8/1989 | Perun | 219/121.71 |
| 5,032,702 A | 7/1991 | Scholz | 219/85.22 |
| 5,075,532 A | 12/1991 | Wakabayashi | 219/121.13 |
| 5,523,544 A | 6/1996 | Hertzel et al. | 219/121.7 |
| 6,346,678 B1 | * 2/2002 | Kono et al. | 174/255 |
| 6,365,844 B2 | * 4/2002 | Nishii et al. | 174/264 |
| 6,576,493 B1 | * 6/2003 | Lin et al. | 438/107 |
| 2001/0019177 A1 | * 9/2001 | Sugihara | 257/780 |

FOREIGN PATENT DOCUMENTS

| | | | |
|---|---|---|---|
| JP | 4-209781 | * | 7/1992 |
| JP | 4-334087 | * | 11/1992 |
| JP | 08309486 | | 11/1996 |
| WO | WO 90/01393 | | 2/1990 |

OTHER PUBLICATIONS

International Search Report, Application No. PCT/US03/27987; date of Completion, Dec. 9, 2003.

* cited by examiner

Primary Examiner—John J. Zimmerman

(57) ABSTRACT

A workpiece is coated with carbonizable polymer for laser machining an aperture through the workpiece. The workpiece is protected by the polymer during laser machining so that the surface of the workpiece and areas surrounding the aperture are substantially free of debris produced by the laser machining process. The carbonized polymer is removed after laser machining. A method of forming an aperture by a laser on a thin metallic plate is also described.

16 Claims, 3 Drawing Sheets

ANTI-SPATTER COATING FOR LASER MACHINING

This application is a continuation-in-part of U.S. patent application Ser. No. 10/235,503, entitled "Anti-Spatter Coating for Laser Machining" and filed on Sep. 6, 2002, which claims the benefit of provisional application 60/318,690 filed Sep. 7, 2001, which application is incorporated herein by reference in its entirety.

BACKGROUND OF THE INVENTION

A common way of machining orifice holes is punching. It is believed that smaller orifices can be formed with no loss in productivity through the use of laser machining. At least two techniques are believed to be useful for laser machining orifices. One is trepanning or helical drilling, the other is percussion drilling. Percussion drilling is believed to be less desirable due to the less controlled nature of metal heating and expulsion that increases the risk of a non-cylindrical or non-circular orifice. Trepanning, on the other hand, is believed to be more precise as a center hole is initially formed before the formation of the orifice. Helical drilling is similar to trepanning but without the initial formation of a center hole. However, it is believed that neither trepanning nor percussion drilling provides for a desired formation of entry and exit geometry in the orifices.

With laser machining, debris (recast material, melted material and soot from machining) can be formed both immediately at the perimeter of the orifice and on the surface some distance from it on both the entry and exit sides of the orifice. This leads to an orifice that is not uniform dimensionally with respect to, such as, the diameter, exit or entry geometry of the orifices.

SUMMARY OF THE INVENTION

The present invention provides for protection of a workpiece during laser machining of an aperture through the workpiece so that the surface of the workpiece and areas surrounding the aperture are substantially free of debris produced by the laser machining process. In particular, a preferred embodiment of the present invention provides for a thin metallic plate. The metallic plate comprises first and second surfaces of the metallic plate being spaced apart at a distance of approximately 50 to 300 microns. The metallic plate includes at least one orifice extending between the first and second surfaces. The at least one orifice is formed, in part, by forming a carbonizable polyimide coating on one of the first and second surfaces; drilling the orifices through the coating and the first and second surfaces so that a taper of the at least one orifice is less than 10% and ellipticity of each orifice is less than 10%; and removing the coating. The taper is defined as a difference between average entry diameter and average exit diameter and divided by thickness of the work piece multiplied by 100, and the ellipticity is defined as a difference between the major diameter and minor diameter multiplied by two and the result divided by the sum of the major diameter and minor diameter multiplied by 100.

The present invention also provides a method of forming an aperture on a thin metallic workpiece by a laser. The method can be achieved, in part, by forming a carbonizable polymer coating over at least one surface of the workpiece; machining at least one aperture between the at least one surface and another surface of the workpiece via a laser so that so that, upon removal of the polymer, a taper of the at least one orifice is less than 10% and ellipticity of each orifice is less than 10%, the taper being a difference between average entry diameter and average exit diameter and divided by thickness of the work piece times 100, the ellipticity being a difference between the major diameter and minor diameter multiplied by two and the result divided by the sum of the major diameter and minor diameter times 100; and removing the carbonizable polymer from the workpiece.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENTS

Figures 1, 2, 3:
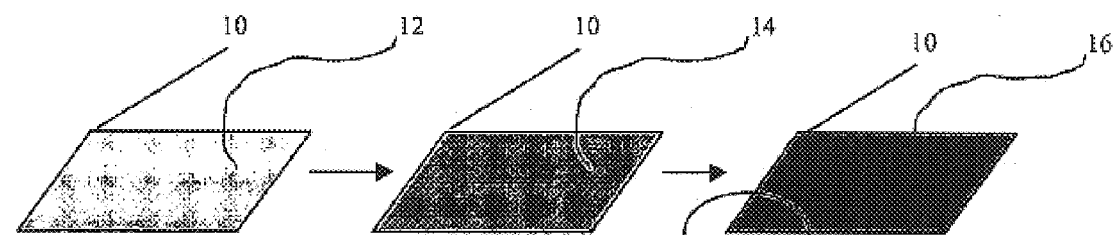
FIG. 1 illustrates an exemplary untreated workpiece.
FIG. 2 illustrates the exemplary workpiece with a substantially liquid coating deposited on the workpiece.
FIG. 3 illustrates the exemplary workpiece with a substantially solid coating formed on the workpiece.
Figure 4:
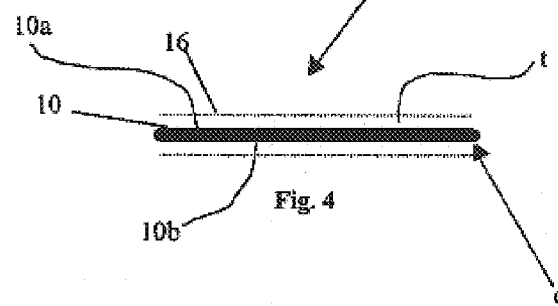
FIG. 4 illustrates a cross-sectional view of the workpiece with the solid coating.

FIGS. 1–8 illustrate preferred embodiments of the workpiece 10 and methods relating to machining of the workpiece 10. Initially, an untreated workpiece 10 is placed in an environment so that it can be cleaned and preferably exposed to an ambient environment. The workpiece is cleaned with chemical solvent or degreaser and coated with a substantially liquid pre-polymer precursor 12, shown here in FIG. 1. The workpiece 10 can be of any suitable material and dimension or shapes for laser machining, including that of a thin metallic plate. Preferably, the workpiece 10 is stainless steel and generally planar in shape with a first surface 10a generally parallel to a second surface 10b at a distance (i.e. a thickness "d") of approximately 50 to 600 microns, and more particularly of about 300 microns, see FIG. 4.

The pre-polymer precursor 12 can include a suitable thermoset polymer precursor such as, for example, epoxy resins, polycarbonates, polyacrylamide or polyimide. The pre-polymer precursor 12 can be applied by transfer stamping, pouring, spraying, spreading, or being brushed on the surface of the workpiece 10. Preferably, the precursor 12 is applied by a transfer-stamping member (not shown). The transfer-stamping member is dipped in polyamic acid and is pressed or stamped on the workpiece so that a coat of polyamic acid is distributed over the workpiece on at least one of the first and second surfaces 10a or 10b. In a preferred embodiment, the polymer precursor 12 is dried in an ambient atmosphere. In another preferred embodiment, the precursor-coated workpiece 10 is allowed to dry in an enclosure (not shown for clarity) containing an inert gas mixture at ambient room temperature. Regardless of the drying techniques, once the precursor coating is dried, the workpiece can be placed in an enclosure, such as, for example, a thermostatically controlled oven. The temperature of the enclosure is preferably raised to a first temperature by heating the enclosure from ambient temperature in a linear manner. Alternatively, the temperature can also be raised from ambient temperature to the first temperature in a step-wise fashion over time. As the temperature rises in the enclosure, the polymer precursor 12 proceeds through a thermosetting process. To prevent surface stress once the polymer precursor 12 has been generally converted to a thermoset polymer that forms a polymeric coating 14 over the workpiece 10 in FIG. 3, the temperature of the enclosure can be reduced in a stepwise fashion to ambient room temperature.

The polymer precursor is preferably a polyimide precursor 12 in liquid form. The polyimide precursor 12 can be converted to either aromatic or linear polyimide by chemical or thermal conversion of the precursor 12 to a rigid polyimide coating containing imides and carbonyl groups. Preferably, the polyimide precursor 12 is a polyamic acid coating, which may contain dissolved acids and solvents but is exclusive of surfactants. Also preferably, the polyamic acid coating 12 has a thickness of between approximately 50–500 microns prior to being polymerized at a temperature of approximately 150 degrees Celsius over a duration sufficient to polymerize the polyimide at a first level that is generally free of carbonized polymers in a substantially inert gas mixture, such as Argon or Nitrogen. Preferably, the duration is between approximately 10 minutes to 30 minutes in a substantially Argon gas mixture. In preferred embodiments, the polymerized coating 16 has a thickness "t" between approximately 50–500 microns.

Figures 5, 6, 7:
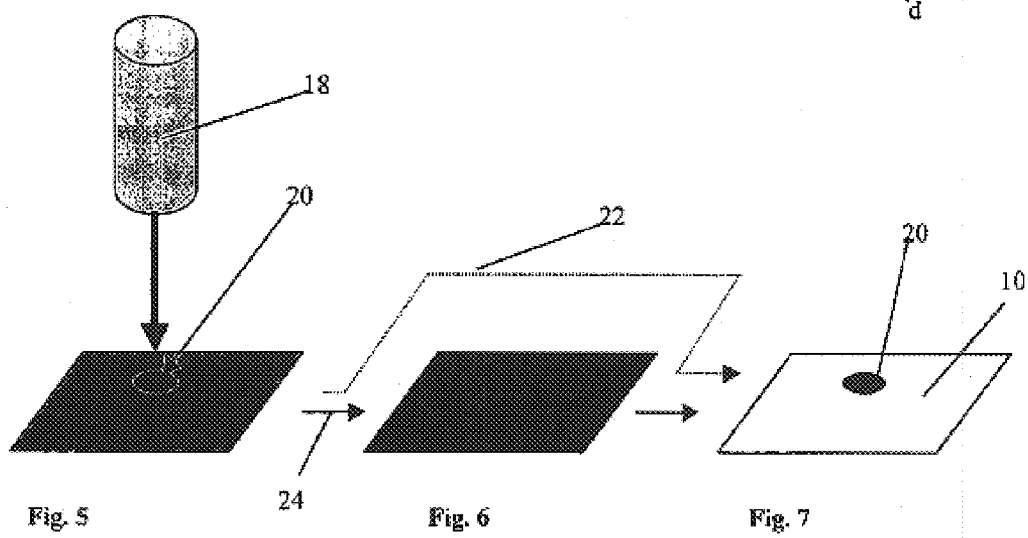
FIG. 5 illustrates a laser machining operation being performed on the workpiece of FIG. 3.
FIG. 6 illustrates another material treatment on the exemplary workpiece.
FIG. 7 illustrates workpiece after removal of the coating of the workpiece.

The polymer coated workpiece 10 of FIG. 3 can now be machined with a laser 18 shown schematically in FIG. 5, such as, for example, a $CO_2$, copper vapor, an excimer laser or a Nd:YAG laser. Alternatively, further thermal treatments can be given to workpiece 10 instead of being laser machined at this point. Preferably, the polymer coating 14 is heated in the same enclosure to a second temperature higher than the first temperature at second duration sufficient to transform a portion of the polymer 14 to a carbonized form of polyimide polymer 16 (i.e. a polymeric substance with internal structures that are very similar to graphite) in FIG. 3. The polymer 16 is transformed to a second level having a generally carbonized layer sufficient to resist high temperature generated during a long duration (i.e., one millisecond or greater) laser machining of the orifices. Another benefit from the curing at the second temperature is that the carbonized polymer layer and the polymer can be removed as a single layer after laser machining. Preferably, the second temperature is approximately 400 degrees Celsius at duration sufficient for the polymer to form a generally carbonized polymer layer.

As shown in FIG. 5, the laser 18 machines the workpiece 10 by material transformation, welding or material removal, especially drilling through the workpiece 10. Depending on the power level of the laser, the orifice 20 can be formed by a single high-powered pulse or multiple lower powered pulses over a single or multiple durations sufficient to machine through the workpiece. The duration of laser machining can be as short as a fraction of a millisecond, thirty seconds or in multiple durations of time. Preferably, the laser machine is configured to drill in the workpiece 10 circular orifices 20 extending through the workpiece 10 of approximately 20 microns to 300 microns in diameter, and particularly one or more orifices of about 160 microns in diameter over a duration of one of a fraction of a millisecond, at least one millisecond, or multiple pulses over a duration of up to 30 seconds.

Subsequent to the laser machining, the polymer on the workpiece 10 can be removed mechanically or chemically. In mechanical removal, physical movement of the workpiece, such as, for example, ultrasonic vibration, flexing or bending of the workpiece can remove the polymer or carbonized polymer coating in FIG. 7. Additionally, mechanical removal can involve physical contact with another structure such as, for example, a blade, a hammer or a vibratory tool. Chemical removal can be performed by washing or soaking the workpiece in a solvent such as, for example, water or acetone. Chemical removal can also be combined with mechanical removal such as, for example, ultrasonic oscillation while immersed in water. Preferably, the coating at the second level is ultrasonically removed in a bath of water.

Figure 8:
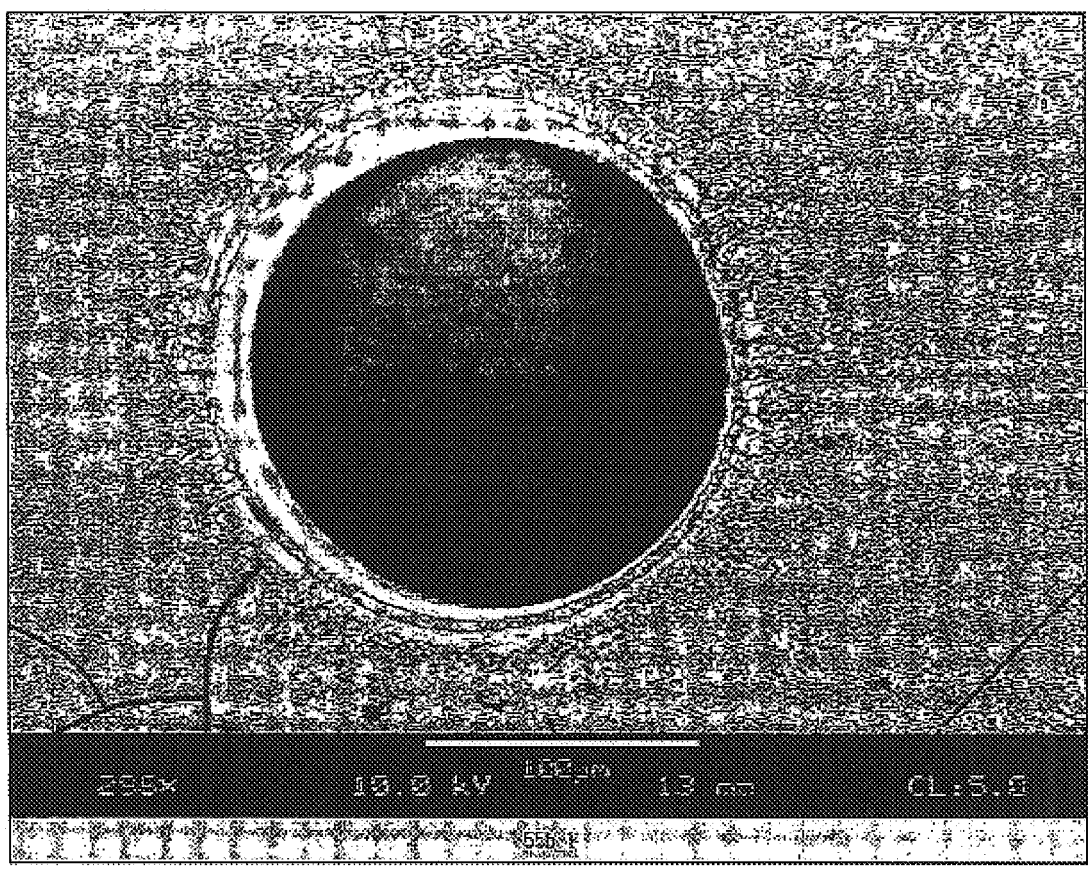
FIG. 8 illustrates a workpiece with the polymeric coating before removal of the coating and subsequent to a laser machining operation of the orifice on the workpiece.

Instead of moving directly to removal from FIG. 5 to FIG. 7 (shown as dashed line 22), the polymerized coating can be heated (shown as solid line 24) to a third temperature in the enclosure over a third duration sufficient to transform the polymer in FIG. 5 to a third level containing substantially or nearly all carbonized polymer in FIGS. 6 and 8. The carbonized polymer 16 at the third level tends to be very brittle throughout its thickness, thereby facilitating mechanical removal. As used herein, the term "generally" carbonized denotes a range of between 10% to 50% of the polymer coating 14 that are carbonized, and the term "substantially" carbonized denotes a range covering between 50% to 100% of the polymer 14 that are carbonized.

Figure 9:
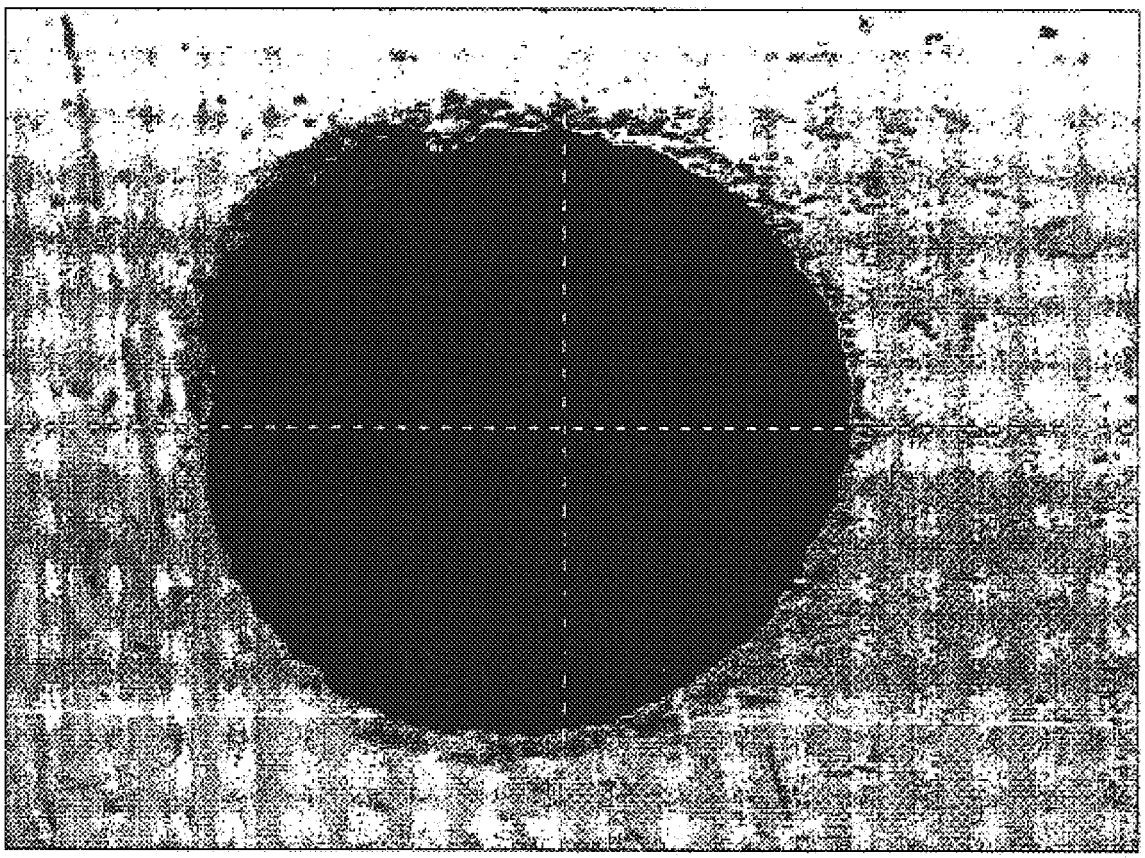
FIG. 9 illustrates an uncoated workpiece with an orifice formed by laser machining.

An example of a workpiece without a coating prior to and subsequent to laser drilling is shown in FIG. 9. In particular, soot and molten debris can be seen around the orifice after a laser machines the workpiece 10. The unwanted debris can affect the quality of the orifice during and after the laser machining. In contrast, the exemplary intermediate product in FIG. 8 (which underwent carbonization, drilling and further carbonization but prior to removal of the polymer, as shown in FIGS. 1–6) is a workpiece with little or no debris, soot or recasts from the laser machining over a relatively long laser machining operation on the workpiece and around the orifice.

During testings, it has been discovered that air dried samples of a preferred embodiment of the polymer coating allow for a taper of orifices formed by laser through the work pieces to be approximately 10% or less with ellipticity of the orifice also approximately 10% or less. Samples of the preferred embodiments that were heated to approximately 150 degrees Celsius allow for a taper formed by laser through the work pieces to vary between approximately 3% to approximately 6% with ellipticity of the orifices to vary between approximately 3% to approximately 5%. Samples of the preferred embodiment that were heated to approximately 400 degrees Celsius allow for a taper to vary from between approximately 5% to approximately 7% and the ellipticity of the orifices to vary between approximately 3% to approximately 5%. As used herein, taper of the orifice is defined in percent form as a difference between average entry diameter and average exit diameter and divided by thickness of the work piece times 100. Also as used herein, the ellipticity is defined as two times the difference between the major diameter and minor diameter and the result divided by the sum of the major diameter and minor diameter times 100.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A metallic plate, comprising
   first and second surfaces of the metallic plate being spaced apart at a distance of approximately 50 to 300 microns; and
   at least one orifice extending between the first and second surfaces, the at least one orifice being formed by:
      forming a carbonizable polyimide coating on one of the first and second surfaces;
      drilling the orifices through the coating and then the first and second surfaces so that a taper of the at least one orifice is less than approximately 10% and ellipticity of each orifice is less than approximately 10%, the taper being a difference between average entry diameter and average exit diameter and divided by thickness of the work piece multiplied by 100, the ellipticity being a difference between the major diameter and minor diameter multiplied by two and the result divided by the sum of the major diameter and minor diameter multiplied by 100; and
      removing the coating.

2. The metallic plate of claim 1, wherein the forming further comprises generally carbonizing the polyimide coating at a first temperature so that the taper of the at least one orifice is between approximately 3% to approximately 7% and the ellipticity of the at least one orifice is between 2% to 5%.

3. The metallic plate of claim 2, wherein the removing further comprises substantially carbonizing all of the polyimide coating at a second temperature higher than the first temperature so that the taper of the at least one orifice is between approximately 5% to approximately 7% and the ellipticity of the at least one orifice is between approximately 3% to approximately 5%.

4. A method of forming an aperture on a thin metallic workpiece, comprising:
   transforming a liquid polymer precursor on at least one surface of the workpiece to a solid thermoset polymer at a first temperature and duration in an inert gas mixture to a first level essentially free of carbonized polymer;
   machining at least one aperture between the at least one surface and another surface of the workpiece via a laser so that, upon removal of the polymer, a taper of the at least one orifice is less than approximately 10% and ellipticity of each orifice is less than approximately 10%, the taper being a difference between average entry diameter and average exit diameter and divided by thickness of the work piece times 100, the ellipticity being a difference between the major diameter and minor diameter multiplied by two and the result divided by the sum of the major diameter and minor diameter times 100; and
   removing the carbonizable polymer from the workpiece.

5. The method of claim 4, wherein the transforming further comprises carbonizing the solid thermoset polymer at a second temperature and duration sufficient to achieve a second level of carbonized polymer so that, upon removal of the polymer, the taper of the at least one orifice is between approximately 3% to approximately 7% and the ellipticity of the at least one orifice is between approximately 2% to approximately 5%.

6. The method of claim 4, wherein the polymer precursor is selected from a group comprising one of a polyimide precursor, polyamic acid and epoxy resins.

7. The method of claim 6, wherein the removing comprises heating the carbonized thermoset polymer at the second level of carbonized polymer to a third temperature and duration so that the polymer is carbonized to a third level containing substantially all carbonized polymer so that, upon removal of the polymer, the taper of the at least one orifice is between approximately 5% to approximately 7% and the ellipticity of the at least one orifice is between approximately 3% to approximately 5%.

8. The method of claim 4, wherein the removing comprises separating the substantially all carbonized polymer from the workpiece by vibrating or flexing of the workpiece or by physical contact of the polymer with a physical structure.

9. The method of claim 8, wherein the physical structure comprises one of a scraper, a razor blade, a vibratory table or hammer.

10. The method of claim 9, wherein the vibrating comprises ultrasonically oscillating the workpiece.

11. The method of claim 10, wherein the vibrating further comprises immersing the workpiece in a solvent solution.

12. The method of claim 4, wherein the transforming comprises:
   transforming a substantially solid polymeric coating material from a liquid thermoset polymer precursor on the workpiece at a first temperature in an inert gas; and
   drilling a circular aperture through the coating and the workpiece by a laser at a duration greater than one millisecond.

13. The method of claim 4, wherein the machining comprises:
   generally carbonizing the polymeric coating material in an inert gas mixture; and
   drilling a circular aperture through the coating and the workpiece by a laser at a duration of about one millisecond.

14. The method of claim 13, wherein the transforming further comprises:
   carbonizing the polymeric coating material to a third level at a third temperature and duration in the inert gas mixture.

15. The method according to one of claims 12 or 13, wherein the duration is selected from a group comprising one of a duration of between approximately one and approximately thirty seconds, and multiple pulses of approximately ten seconds per pulse.

16. The method according to claim 13, wherein the duration is approximately a fraction of a millisecond.

* * * * *